(12) United States Patent
Wang et al.

(10) Patent No.: US 12,500,762 B2
(45) Date of Patent: Dec. 16, 2025

(54) PARALLEL MULTIPLIER FOR SABER ALGORITHM

(71) Applicant: Wenzhou University, Zhejiang (CN)

(72) Inventors: Pengjun Wang, Zhejiang (CN); Jie Lv, Zhejiang (CN); Bo Chen, Zhejiang (CN)

(73) Assignee: Wenzhou University, Zhejiang (CN)

( * ) Notice: Subject to any disclaimer, the term of this patent is extended or adjusted under 35 U.S.C. 154(b) by 364 days.

(21) Appl. No.: 18/152,773

(22) Filed: Jan. 11, 2023

(65) Prior Publication Data

US 2024/0015011 A1 Jan. 11, 2024

(30) Foreign Application Priority Data

Jul. 6, 2022 (CN) .......................... 202210788295.8

(51) Int. Cl.
*H04L 9/30* (2006.01)
*G06F 7/72* (2006.01)
*G06F 17/16* (2006.01)

(52) U.S. Cl.
CPC .............. *H04L 9/3066* (2013.01); *G06F 7/72* (2013.01); *G06F 17/16* (2013.01); *H04L 9/3026* (2013.01)

(58) Field of Classification Search
CPC ....... H04L 9/3066; H04L 9/3026; G06F 7/72; G06F 17/16

(Continued)

(56) References Cited

U.S. PATENT DOCUMENTS 8,903,083 B2 * 12/2014 Gentry ................. H04L 9/3026
380/28
11,050,557 B2 * 6/2021 Bhattacharya ........ H04L 9/0841
(Continued)

FOREIGN PATENT DOCUMENTS

CN 110908635 A * 3/2020 ............... G06F 7/72
CN 112819168 A * 5/2021 ............. G06F 7/722
(Continued)

OTHER PUBLICATIONS

Garcia et al., "A Study of Post Quantum Cipher Suites for Key Exchange," 2021 IEEE International Symposium on Technologies for Homeland Security (HST), Boston, MA, USA, 2021, pp. 1-7, doi: 10.1109/HST53381.2021.9619839. (Year: 2021).*

(Continued)

*Primary Examiner* — Peter C Shaw
(74) *Attorney, Agent, or Firm* — JCIPRNET

(57) ABSTRACT

A parallel multiplier for the Saber algorithm comprises a coefficient memory, two parallel pre-adding circuits, three parallel multiplication circuits and a post-adding circuit. The coefficient memory, the two parallel pre-adding circuits, the three parallel multiplication circuits and the post-adding circuit adopt a divide-and-conquer strategy, the two parallel pre-adding circuits perform parallel computation, and the three parallel multiplication circuits perform parallel computation, such that the computation time of modulo multiplication is shorted; the modulo operation of non-prime numbers is realized by limiting the bit width, such that the constraint that the modulus is a prime number is avoided; and the Karatsuba algorithm is called once, such that extra circuit area expenditure is reduced. Thus, the parallel multiplier for the Saber algorithm is implemented by hardware, low in computation complexity, not limited by the constraint (Continued)

that the modulus is a prime number, and low in circuit area expenditure.

1 Claim, 7 Drawing Sheets

(58) Field of Classification Search
USPC .......................................................... 380/30
See application file for complete search history.

(56) References Cited

U.S. PATENT DOCUMENTS

| | | | |
|---|---|---|---|
| 11,416,638 B2 * | 8/2022 | Banerjee | G06F 7/724 |
| 11,444,767 B1 * | 9/2022 | Renes | G06F 7/722 |
| 11,818,244 B2 * | 11/2023 | Bajpeyi | H04L 9/008 |
| 2020/0082738 A1 * | 3/2020 | Poeppelmann | H04L 9/002 |
| 2023/0125560 A1 * | 4/2023 | Lablans | H03M 7/00 380/28 |

FOREIGN PATENT DOCUMENTS

| | | | | |
|---|---|---|---|---|
| CN | 114371828 A | * | 4/2022 | .............. G06N 10/00 |
| CN | 114371829 A | * | 4/2022 | .............. G06F 7/501 |
| CN | 114780057 A | * | 7/2022 | ............ G06F 21/602 |
| CN | 116166218 A | * | 5/2023 | .............. G06F 7/523 |
| JP | 2022134466 A | * | 9/2022 | |
| KR | 20230028626 A | * | 3/2023 | .............. G06F 7/722 |
| WO | WO-2022053812 A1 | * | 3/2022 | ............ H04L 9/0869 |
| WO | WO-2022243781 A1 | * | 11/2022 | ............ G11C 7/1006 |

OTHER PUBLICATIONS

Tu et al., "Hardware Implementation of High-Performance Polynomial Multiplication for KEM Saber," 2022 IEEE International Symposium on Circuits and Systems (ISCAS), Austin, TX, USA, 2022, pp. 1160-1164, doi: 10.1109/ISCAS48785.2022.9937606. (Year: 2022).*

He et al., "Hardware-Implemented Lightweight Accelerator for Large Integer Polynomial Multiplication," in IEEE Computer Architecture Letters, vol. 22, No. 1, pp. 57-60, Jan.-Jun. 2023, doi: 10.1109/LCA.2023.3274931. (Year: 2023).*

Meselhi et al., "Parallel Evolutionary Algorithm for EEG Optimization Problems," 2021 IEEE Congress on Evolutionary Computation (CEC), Kraków, Poland, 2021, pp. 2577-2584, doi: 10.1109/CEC45853.2021.9504925. (Year: 2021).*

Basso et al., "Optimized Polynomial Multiplier Architectures for Post-Quantum KEM Saber," 2021 58th ACM/IEEE Design Automation Conference (DAC), San Francisco, CA, USA, 2021, pp. 1285-1290, doi: 10.1109/DAC18074.2021.9586219. (Year: 2021).*

Cui et al., "High-Throughput Polynomial Multiplier for Accelerating Saber on FPGA," in IEEE Transactions on Circuits and Systems II: Express Briefs, vol. 70, No. 9, pp. 3584-3588, Sep. 2023, doi: 10.1109/TCSII.2023.3264803. (Year: 2023).*

He et al., "HPMA-Saber: High-Performance Polynomial Multiplication Accelerator for KEM Saber," 2022 IEEE 40th International Conference on Computer Design (ICCD), Olympic Valley, CA, USA, 2022, pp. 525-528, doi: 10.1109/ICCD56317.2022.00083. (Year: 2022).*

Imran et al., "High-Speed Design of Post Quantum Cryptography With Optimized Hashing and Multiplication," in IEEE Transactions on Circuits and Systems II: Express Briefs, vol. 71, No. 2, pp. 847-851, Feb. 2024, doi: 10.1109/TCSII.2023.3273821. (Year: 2023).*

Wong et al., "KaratSaber: New Speed Records for Saber Polynomial Multiplication Using Efficient Karatsuba FPGA Architecture," in IEEE Transactions on Computers, vol. 72, No. 7, pp. 1830-1842, Jul. 1, 2023, doi: 10.1109/TC.2023.3238129. (Year: 2023).*

Zhu et al., "A High-performance Hardware Implementation of Saber Based on Karatsuba Algorithm," https://ieeexplore.ieee.org/document/9321216, Apr. 23, 2021. (Year: 2021).*

* cited by examiner

PARALLEL MULTIPLIER FOR SABER ALGORITHM

CROSS-REFERENCE TO RELATED APPLICATION

This application claims the priority benefit of China application no. 202210788295.8, filed on Jul. 6, 2022. The entirety of the above-mentioned patent application is hereby incorporated by reference and made a part of this specification.

BACKGROUND OF THE INVENTION

1. Technical Field

The invention relates to a multiplier, in particular to a parallel multiplier for the Saber algorithm.

2. Description of Related Art

Public keys are widely used in important fields such as information network security and national defense security, and the security of the public key system relies on mathematical problems, such as RSA based on integer prime factorization and ECC based on discrete logarithm problems. However, with the development of quantum computation, the Shor algorithm and the Grover search algorithm will destroy the security of the public key encryption system and symmetric encryption. Novel public key schemes capable of defending against quantum attacks, namely post-quantum cryptography (PQC), attract the interest of cryptographers.

The Saber algorithm based on Module Learning with Rounding is one of the novel public key schemes capable of defending against quantum attacks, and modulo multiplication on a polynomial quotient ring in the Saber algorithm ensures that the Saber algorithm has the function of defending against quantum attacks. However, the modulo multiplication existing in the key generation stage, the encryption stage and the decryption stage of the Saber algorithm will lead to the problem of excessive operation expenditure, that is, the efficiency of modulo multiplication directly restricts the operational performance of the Saber algorithm. Since the standardization of PQC, the modular multiplication efficiency is studied based on the Schoolbook, Toom-Cook and Karatsuba to overcome the defects of the Saber algorithm in modulo multiplication efficiency. Basso et al. realized three multipliers with different properties by reducing the area expenditure based on convenient Schoolbook multiplication and the mechanism of centralized multiplication of multinomial coefficients. However, these three multipliers are high in computation complexity and low in computation speed. Mera et al. proposed a precomputation-based interpolation technique to reduce the expenditure of memory resources and realized a low-computation complexity multiplication architecture based on the Toom-Cook algorithm. This scheme reduces the computation complexity. However, since it is realized by software, compared with multiplication architectures realized by hardware circuits, the computation speed of this scheme is still unsatisfying although it has been increased to some extent. Tan et al. designed a high-speed parallel modulo multiplication unit by selecting suitable prime numbers to decrease the bit width of data based on the Karatsuba algorithm, but the modulus needs to be a prime number, which constrains this scheme. Zhu et al. improved the computation efficiency of modulo multiplication by multi-layer calling of the Karatsuba algorithm, but extra circuit area expenditure will be caused by repeated calling of the Karatsuba algorithm.

BRIEF SUMMARY OF THE INVENTION

The technical issue to be settled by the invention is to provide a parallel multiplier for the Saber algorithm, which is implemented by hardware, low in computation complexity, not limited by the constraint that the modulus is a prime number, and small in circuit area expenditure.

The technical solution adopted by the invention to settle the above technical issue is as follows: a parallel multiplier for the Saber algorithm comprises a coefficient memory, two parallel pre-adding circuits, three parallel multiplication circuits and a post-adding circuit, wherein the coefficient memory has a coefficient input terminal, a clock input terminal and a coefficient output terminal, the coefficient input terminal of the coefficient memory, as a data input terminal of the parallel multiplier, is used for inputting coefficient data for modulo multiplication of two polynomials, the clock input terminal of the coefficient memory, as a clock input terminal of the parallel multiplier, is used for inputting a clock signal CLK, the two parallel pre-adding circuits are referred to as a first parallel pre-adding circuit and a second parallel pre-adding circuit respectively, the three parallel multiplication circuits are referred to as a first parallel multiplication circuit, a second parallel multiplication circuit and a third parallel multiplication circuit respectively, the first parallel pre-adding circuit has two input ports and a data output port, the second parallel pre-adding circuit has two input ports and a data output port, the first parallel multiplication circuit and the second parallel multiplication circuit each have an input port and an output port, the third parallel multiplication circuit has two input ports and an output port, the post-adding circuit has three input ports and an output port, the two input ports of the first parallel pre-adding circuit and the two input ports of the second parallel pre-adding circuit are connected to the coefficient output terminal of the coefficient memory, the input port of the first parallel multiplication circuit and the input port of the second parallel multiplication circuit are connected to an output port of the coefficient memory, the two input ports of the third parallel multiplication circuit are connected to the output port of the first parallel pre-adding circuit and the output port of the second parallel pre-adding circuit in a one-to-one correspondence manner, the output port of the first parallel multiplication circuit, the output port of the second parallel multiplication circuit and the output port of the third parallel multiplication circuit are connected to the three input ports of the post-adding circuit in a one-to-one correspondence manner, and the output port of the post-adding circuit, as an output terminal of the parallel multiplier, is used for outputting a final result (OUT);

When two polynomials are input to the input terminal of the parallel multiplier, the parallel multiplier multiplies coefficients of the polynomials specifically through the following steps:

S1: Loading the two polynomials into the coefficient memory, and denoting the two polynomials as a polynomial S and a polynomial A respectively, wherein the polynomial S comprises 256 coefficients, the coefficient of an $f^{th}$ term (the $f^{th}$ coefficient) of the polynomial S is denoted as $s_{f-1}$, $f=1, 2, \ldots, 256$, $s_{f-1}$ is an integer, $s_{f-1} \in [-4, 4]$, a vector formed by the 256 coefficients of the polynomial S is $(s_0, s_1, \ldots, s_{255})$, a vector $(s_{128}, s_{129}, \ldots, s_{255})$ formed by the first 128 coefficients of the polynomial S is denoted as $S_H$, a vector $(s_0, s_1, \ldots, s_{127})$ formed by the last 128 coefficients of the polynomial S is denoted as $S_L$, an $n^{th}$ data in $S_L$ is denoted as $S_{Ln}$, $S_{Ln}=s_{n-1}$, n=1, 2, ..., 128, an $n^{th}$ data in $S_H$ is denoted as $S_{Hn}$, and $S_{Hn}=S_{n+127}$; the polynomial A comprises 256 coefficients, each coefficient has a bit width of 16 bits, of which 13 bits or 10 bits are significant bits and the other 3 bits or 6 bits are used for data completion and coefficient alignment, the bit width of the data is set to 16 bits to ensure that read 64 bits data of the polynomial A includes four consecutive coefficients, the coefficient of an $f^{th}$ term (the $f^{th}$ coefficient) of the polynomial A is denoted as $a_{f-1}$, $a_{f-1}$ is an integer, $a_{f-1} \in [0, 8191]$, a vector formed by the 256 coefficients of the polynomial A is $(a_0, a_1, \ldots, a_{255})$, a vector $(a_{128}, a_{129}, \ldots, a_{255})$ formed by the first 128 coefficients of the polynomial A is denoted as $A_H$, a vector $(a_0, a_1, \ldots, a_{127})$ formed by the last 128 coefficients of the polynomial A is denoted as $A_L$, an $m^{th}$ data in $A_L$ is denoted as $A_{Lm}$, $A_{Lm}=a_{m-1}$, m=1, 2, ..., 128, and an $m^{th}$ data in $A_H$ is denoted as $A_{Hm}$, and $A_{Hm}=a_{m+127}$;

S2: Through the output terminal of the coefficient memory, according to a preset time sequence under the control of the clock signal CLK, outputting $A_H$ and $A_L$ to the first parallel pre-adding circuit, outputting $S_H$ and $S_L$ to the second parallel pre-adding circuit, outputting $A_H$ and $S_H$ to the first parallel multiplication circuit, and outputting $A_L$ and $S_L$ to the second parallel multiplication circuit;

Processing $A_H$ and $A_L$ by the first parallel pre-adding circuit according to formula (1) to obtain a result $R_A$, which is output to the third parallel multiplication circuit through the output port of the first parallel pre-adding circuit:

$$ra_{m-1} = (A_{Hm} + A_{Lm}) \bmod 8192 \quad (1)$$

Where, mod is a modulo operator, mod 8192 represents an 8192 modulo operation performed on $(A_{Hm}+A_{Lm})$, $ra_{m-1}$ is an $m^{th}$ data in $R_A$, and $R_A$ includes 128 data $(ra_0, ra_1, \ldots, ra_{127})$;

Processing $S_H$ and $S_L$ by the second parallel pre-adding circuit according to formula (2) to obtain a result $R_S$, which is output to the third parallel multiplication circuit through the output port of the second parallel pre-adding circuit:

$$rs_{n-1} = (S_{Hn} + S_{Ln}) \quad (2)$$

Where, $rs_{n-1}$ is an $n^{th}$ data in $R_S$, and $R_S$ includes 128 data $(rs_0, rs_1, \ldots, rs_{127})$;

S3: Processing $A_H$ and $S_H$ by the first parallel multiplication circuit through the following steps to obtain an output result $P_0$, which is output to the post-adding circuit:

S3.1: setting a round variable k and an intermediate vector T including 255 data, wherein $T=(t_{1\_0}, t_{1\_1}, \ldots, t_{1\_254})$, $t_{1\_j}$ is a $(j+1)^{th}$ data in T, and j=0, 1, 2, ..., 254; k and T are initialized to k=1, $t_{1\_j}=0$;

S3.2: performing a $k^{th}$ round of shift accumulation, which specifically comprises:

S3.2.1: setting an intermediate vector $R_k$, and calculating each data in the intermediate vector $R_k$ according to formula (3):

$$r_{k\_n-1} = A_{Hk} \times S_{Hn} \quad (3)$$

Where, $r_{k\_n-1}$ is an $n^{th}$ data in $R_k$, and $R_k$ includes 128 data $(r_{k\_0}, r_{k\_1}, \ldots, r_{k\_127})$;

S3.2.2: setting an intermediate $P_0^k$ including 255 data, $P_0^k = (p_{k\_0}, p_{k\_1}, \ldots, p_{k\_254})$, where $p_{k\_j}$ is a $(j+1)^{th}$ data in $P_0^k$;

When k=1, $p_{k\_d}=t_{1\_d}+r_{k\_d}$, $p_{k\_b}=t_{1\_b}$, where d=0, 1, 2, ..., 127, b=128, 129, ... 254, and the values of $t_{1\_d}$ and $t_{1\_b}$ are current latest values;

When 2≤k<128, $p_{k\_0}=t_{1\_0}, \ldots, p_{k\_k-2}=t_{1\_k-2}$; $p_{k\_k-1}=t_{1\_k-1}+r_{k\_0}$, $p_{k\_k}=t_{1\_k}+r_{k\_1}, \ldots, p_{k\_k+126}=t_{1\_k+126}+r_{k\_127}$; $p_{k\_k+127}=t_{1\_k+127}, \ldots p_{k\_254}=t_{1\_254}$, where the value of $t_{1\_j}$ is a current latest value;

When k=128, $p_{k\_e}=t_{1\_e}+r_{k\_e}$, $p_{k\_g}=t_{1\_g}$, where e=0, 1, 2, ..., 126, g=127, 128, ..., 254, and the values of $t_{1\_e}$ and $t_{1\_g}$ are current latest values;

S3.2.3: updating each data in the intermediate vector T; $t_{1\_j}=p_{k\_j}$;

S3.3: determining whether the value of k is equal to 128; in response the value of k being not equal to 128, updating the value of k to the sum of a current value of k and 1, and then returning to S3.2 to perform the next round of shift accumulation; in response the value of k being equal to 128, setting $p_{128\_j}=p_j'$ and outputting result $P_0 = (p_0', p_1', \ldots, p_{254}')$, where $p_j'$ is a $(j+1)^{th}$ data in $P_0$;

Processing $A_L$ and $S_L$ by the second parallel multiplication circuit through the following steps to obtain an output result $P_1$, which is output to the post-adding circuit:

S3.4: setting a round variable ba and an intermediate variable U including 255 data, where $U=(u_{1\_0}, u_{1\_1}, \ldots, u_{1\_254})$, and $u_{1\_j}$ is a $(j+1)^{th}$ data in U; ba and U are initialized to ba=1, $u_{1\_j}=0$;

S3.5: performing a $ba^{th}$ round of shift accumulation, which specifically comprises:

S3.5.1: setting an intermediate vector $V_{ba}$, and calculating each data in the intermediate vector $V_{ba}$ according to formula (4):

$$v_{ba\_n-1} = A_{Lba} \times S_{Ln} \quad (4)$$

Where, $v_{ba\_n-1}$ is an $n^{th}$ data in $V_{ba}$, and $V_{ba}$ includes 128 data $(v_{ba\_0}, v_{ba\_1}, \ldots, v_{ba\_127})$;

S3.5.2: setting an intermediate vector $P_1^{ba}$ including 255 data, $P_1^{ba} = (c_{ba\_0}, c_{ba\_1}, \ldots, c_{ba\_254})$, where $c_{ba\_j}$ is a $(j+1)^{th}$ data in $P_1^{ba}$;

When ba=1, $c_{ba\_da}=u_{1\_da}+v_{ba\_da}$, $c_{ba\_bb}=u_{1\_bb}$, where da=0, 1, 2, ..., 127, bb=128, 129, ..., 254, and the values of $u_{1\_da}$ and $u_{1\_bb}$ are current latest values;

When 2≤ba<128, $c_{ba\_0}=u_{1\_0}, \ldots, c_{ba\_ba-2}=u_{1\_ba-2}$; $c_{ba\_ba-1}=u_{1\_ba-1}+v_{ba\_0}$, $c_{ba\_ba}=u_{1\_ba}+v_{ba\_1}, \ldots, c_{ba\_ba+126}=u_{1\_ba+126}+v_{ba\_127}$; $c_{ba\_ba+127}=u_{1\_ba+127}, \ldots, c_{ba\_254}=u_{1\_254}$, where the value of $u_{1\_j}$ is a current latest value;

When ba=128, $c_{ba\_bc}=u_{1\_bc}+v_{ba\_bc}$ $c_{ba\_bd}=u_{1\_bd}$, where bc=0, 1, 2, ..., 126, bd=127, 128, ..., 254, and the values of $u_{1\_bc}$ and $u_{1\_bd}$ are current latest values;

S3.5.3: each data in the intermediate vector U is updated, $u_{1\_j}=c_{ba\_j}$;

S3.6: determining whether the value of ba is equal to 128; in response the value of ba being not equal to 128, updating the value of ba to the sum of a current value of ba and 1, and then returning to S3.5 to perform the next round of shift accumulation; in response the value of ba being equal to 128, setting $c_{128\_j}=p_j''$ and outputting result $P_1=(p_0'', p_1'', \ldots, p_{254}'')$, where $p_j''$ is a $(j+1)^{th}$ data in $P_1$;

Processing $R_A$ and $R_S$ by the third parallel multiplication circuit through the following steps to obtain an output result $P_2$, which is output to the post-adding circuit:

S3.7: setting a round variable bf and an intermediate vector W including 255 data, where W=($w_{1\_0}$, $w_{1\_1}$, ..., $w_{1\_254}$), and $w_{1\_j}$ is a $(j+1)^{th}$ data in W; bf and W are initialized to bf=1, $w_{1\_j}$=0;

S3.8: performing a $bf^{th}$ round of shift accumulation, which specifically comprises:

S3.8.1: setting an intermediate vector $Y_{bf}$, and calculating each data in the intermediate vector $Y_{bf}$ according to formula (5):

$$y_{bf\_n-1} = R_{Abf} \times R_{Sn} \quad (5)$$

Where, $y_{bf\_n-1}$ is an $n^{th}$ data in $Y_{bf}$ and $Y_{bf}$ includes 128 data ($y_{bf\_0}, y_{bf\_1}, \ldots, y_{bf\_127}$); $R_{Abf}$ is a $bf^{th}$ data in $R_A$, and $R_{Sn}$ is an $n^{th}$ data in $R_S$;

S3.8.2: setting an intermediate vector $P_2^{bf}$ including 255 data, $P_2^{bf} = (e_{bf\_0}, e_{bf\_1}, \ldots, e_{bf\_254})$, where $e_{bf\_j}$ is a $(j+1)$ data in $P_2^{bf}$;

When bf=1, $e_{bf\_bg} = w_{1\_bg} + y_{bf\_bg}$, $e_{bf\_bm} = w_{1\_bm}$, where bg=0, 1, 2, ..., 127, bm=128, 129, ..., 254, and the values of $w_{1\_bg}$ and $w_{1\_bm}$ are current latest values;

When 2≤bf<128, $e_{bf\_0} = w_{1\_0}$, ..., $e_{bf\_bf-2} = w_{1\_bf-2}$; $e_{bf\_bf-1} = w_{1\_bf-1} + y_{bf\_0}$, $e_{bf\_bf} = w_{1\_bf} + y_{bf\_1}$, ..., $e_{bf\_bf+126} = w_{1\_bf+126} + y_{bf\_127}$; $e_{bf\_bf+127} = w_{1\_bf+127}$, ..., $e_{bf\_254} = w_{1\_254}$, where the value of $w_{1\_j}$ is a current latest value;

When bf=128, $e_{bf\_bn} = w_{1\_bn} + y_{bf\_bn}$, $e_{bf\_bp} = w_{1\_bp}$, where bn=0, 1, 2, ... 126, bp=127, 128, ..., 254, and the values of $w_{1\_bn}$ and $w_{1\_bp}$ are current latest values;

S3.8.3: updating each data in the intermediate vector W, $w_{1\_j} = e_{bf\_j}$;

S3.9: determining whether the value of bf is equal to 128; in response the value of bf being not equal to 128, updating the value of bf to the sum of a current value of bf and 1, and then returning to S3.8 to perform the next round of shift accumulation; in response the value of bf being equal to 128, setting $e_{128\_j} = p_j'''$ and outputting result $P_2 = (p_0''', p_1''', \ldots, p_{254}''')$, where $p_j'''$ is a $(j+1)^{th}$ data in $P_2$;

S4: processing $P_2$, $P_1$ and $P_0$ by the post-adding circuit through the following steps to obtain and output the final operation result OUT, which specifically comprises:

S4.1: setting an intermediate vector $Tmp_0$ including 255 data, and calculating each data in the intermediate vector $Tmp_0$ according to formula (6):

$$tmp_{0\_j} = p_j'' - p_j' \quad (6)$$

Where, $tmp_{0\_j}$ is a $(j+i)^{th}$ data in $Tmp_0$, and $Tmp_0$ includes 255 data ($tmp_{0\_0}, tmp_{0\_1}, \ldots, tmp_{0\_254}$);

S4.2: setting an intermediate vector $Tmp_1$ including 255 data, and calculating each data in the intermediate vector $Tmp_1$ according to formula (7):

$$tmp_{1\_j} = p_j''' - p_j'' - p_j' \quad (7)$$

Where, $tmp_{1\_j}$ is a $(j+1)^{th}$ data in $Tmp_1$, and $Tmp_1$ includes 255 data ($tmp_{1\_0}, tmp_{1\_1}, \ldots, tmp_{1\_254}$);

S4.3: calculating each data in OUT according to formula (8), formula (8), formula (10) and formula (11):

$$out_{loop1} = tmp_{0\_loop1} - tmp_{1\_loop1+128} \quad (8)$$

$$out_{loop2} = tmp_{0\_loop2} - tmp_{1\_loop2-128} \quad (9)$$

$$out_{127} = tmp_{0\_127} \quad (10)$$

$$out_{255} = tmp_{1\_127} \quad (11)$$

Where, loop1=0, 1, ..., 126; loop2=128, 129, ..., 254; OUT includes 256 data ($out_0, out_1, \ldots, out_{255}$).

Compared with the prior art, the invention has the following beneficial effects: the parallel multiplier for the Saber algorithm is formed by a coefficient memory, two parallel pre-adding circuits, three parallel multiplication circuits and a post-adding circuit, the coefficient memory, the two parallel pre-adding circuits, the three parallel multiplication circuits and the post-adding circuit adopt a divide-and-conquer strategy, the two parallel pre-adding circuits perform parallel computation, and the three parallel multiplication circuits perform parallel computation, such that the computation time of modulo multiplication is shorted; the modulo operation of non-prime numbers is realized by limiting the bit width, such that the constraint that the modulus is a prime number is avoided; and the Karatsuba algorithm is called once, such that extra circuit area expenditure is reduced. Thus, the parallel multiplier for the Saber algorithm is implemented by hardware, low in computation complexity, not limited by the constraint that the modulus is a prime number, and low in circuit area expenditure.

DETAILED DESCRIPTION OF THE INVENTION

The invention will be described in further detail below in conjunction with the accompanying drawings and embodiments.

Figure 1:
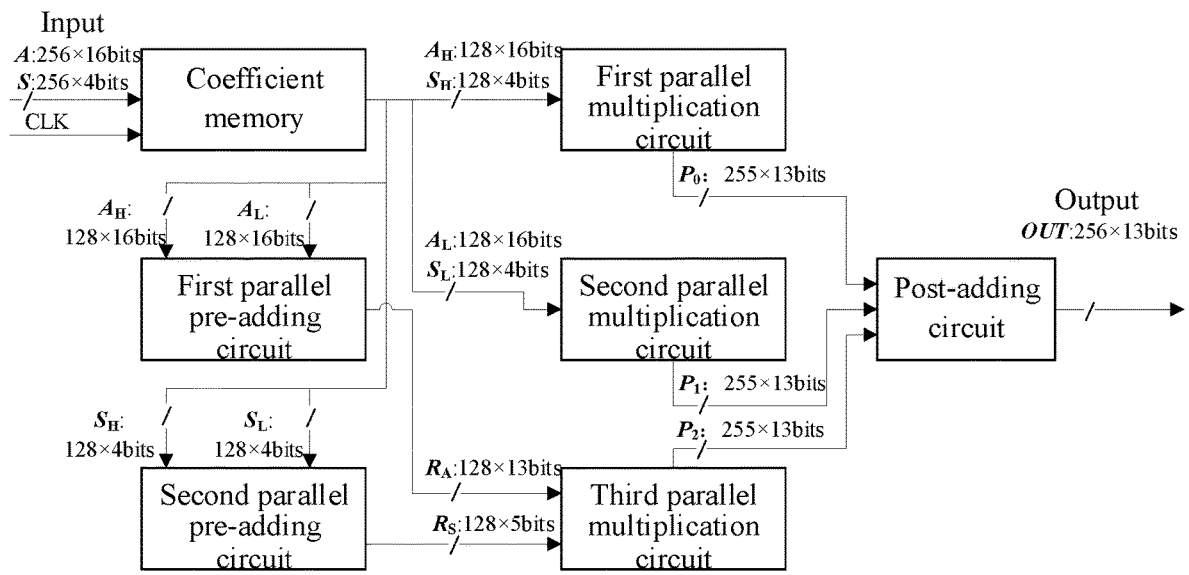
FIG. 1 is a structure and principle block diagram of a parallel multiplier for the Saber algorithm according to the invention.
Figure 2:
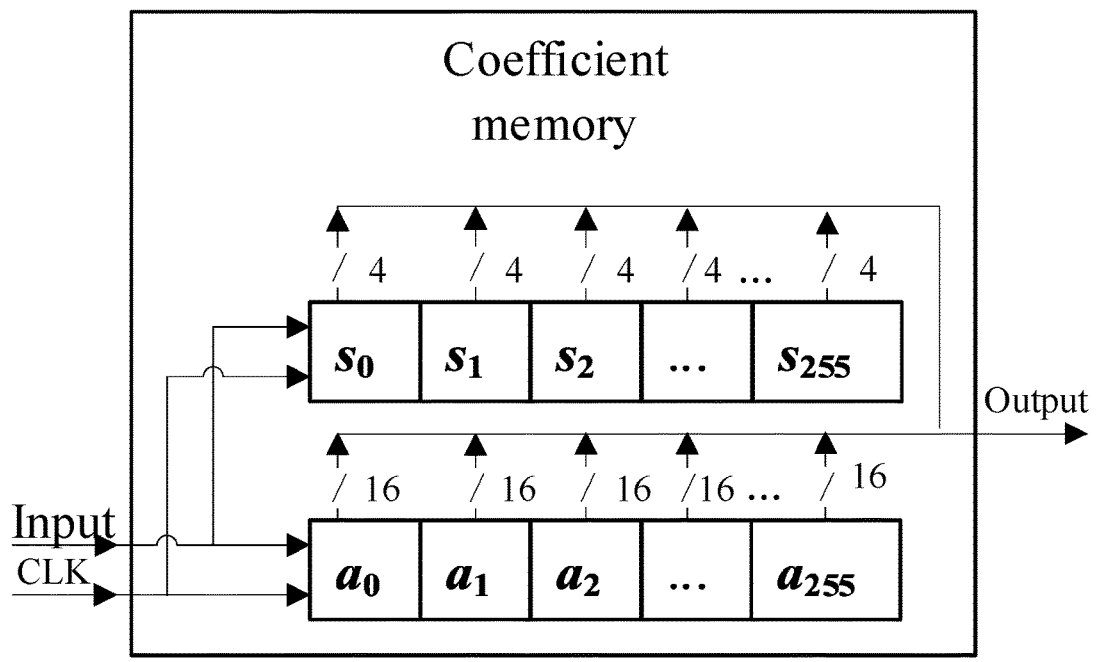
FIG. 2 is a principle block diagram of a coefficient memory of the parallel multiplier for the Saber algorithm according to the invention.
Figure 3:
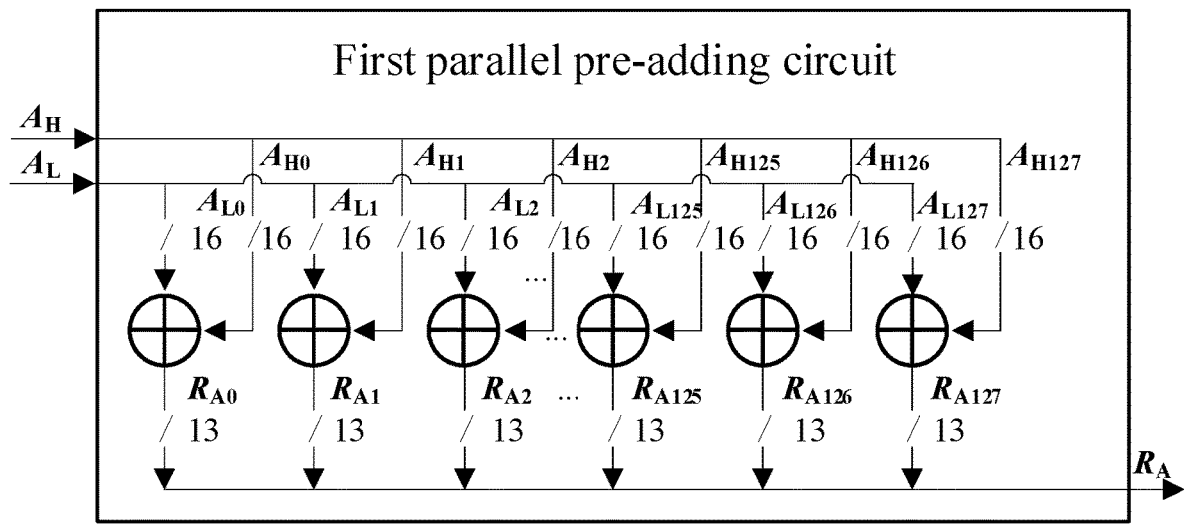
FIG. 3 is a principle block diagram of a first parallel pre-adding circuit of the parallel multiplier for the Saber algorithm according to the invention.

Embodiment: As shown in FIG. 1, a parallel multiplier for the Saber algorithm comprises a coefficient memory, two parallel pre-adding circuits, three parallel multiplication circuits and a post-adding circuit, wherein the coefficient memory has a coefficient input terminal, a clock input terminal and a coefficient output terminal, the coefficient input terminal of the coefficient memory, as a data input terminal of the parallel multiplier, is used for inputting coefficient data for modulo multiplication of two polynomials, the clock input terminal of the coefficient memory, as a clock input terminal of the parallel multiplier, is used for inputting a clock signal CLK, the two parallel pre-adding circuits are referred to as a first parallel pre-adding circuit and a second parallel pre-adding circuit respectively, the three parallel multiplication circuits are referred to as a first parallel multiplication circuit, a second parallel multiplication circuit and a third parallel multiplication circuit respectively, the first parallel pre-adding circuit has two input ports and a data output port, the second parallel pre-adding circuit has two input ports and a data output port, the first parallel multiplication circuit and the second parallel multiplication circuit each have an input port and an output port, the third parallel multiplication circuit has two input ports and an output port, the post-adding circuit has three input ports and an output port, the two input ports of the first parallel pre-adding circuit and the two input ports of the second parallel pre-adding circuit are connected to the coefficient output terminal of the coefficient memory, the input port of the first parallel multiplication circuit and the input port of the second parallel multiplication circuit are connected to an output port of the coefficient memory, the two input ports of the third parallel multiplication circuit are connected to the output port of the first parallel pre-adding circuit and the output port of the second parallel pre-adding circuit in a one-to-one correspondence manner, the output port of the first parallel multiplication circuit, the output port of the second parallel multiplication circuit and the output port of the third parallel multiplication circuit are connected to the three input ports of the post-adding circuit in a one-to-one correspondence manner, and the output port of the post-adding circuit, as an output terminal of the parallel multiplier, is used for outputting a final result (OUT);

When two polynomials are input to the input terminal of the parallel multiplier, the parallel multiplier multiplies coefficients of the polynomials specifically through the following steps:

S1: The two polynomials are loaded into the coefficient memory, and the two polynomials is denoted as a polynomial S and a polynomial A respectively, wherein the polynomial S comprises 256 coefficients, the coefficient of an $f^{th}$ term (the $f^{th}$ coefficient) of the polynomial S is denoted as $s_{f-1}$, $f=1, 2, \ldots, 256$, $s_{f-1}$ is an integer, $s_{f-1} \in [-4, 4]$, a vector formed by the 256 coefficients of the polynomial S is $(s_0, s_1 \ldots, s_{255})$, a vector $(s_{128}, s_{129}, \ldots, s_{255})$ formed by the first 128 coefficients of the polynomial S is denoted as $S_H$, a vector $(s_0, s_1, \ldots, s_{127})$ formed by the last 128 coefficients of the polynomial S is denoted as $S_L$, an $n^{th}$ data in $S_L$ is denoted as $S_L n$, $S_{Ln}=s_{n-1}$, $n=1, 2, \ldots, 128$, an $n^{th}$ data in $S_H$ is denoted as $S_{Hn}$, and $S_{Hn}=s_{n+127}$; the polynomial A comprises 256 coefficients, each coefficient has a bit width of 16 bits, of which 13 bits or 10 bits are significant bits and the other 3 bits or 6 bits are used for data completion and coefficient alignment, the bit width of the data is set to 16 bits to ensure that read 64 bits data of the polynomial A includes four consecutive coefficients, the coefficient of an $f^{th}$ term (the $f^{th}$ coefficient) of the polynomial A is denoted as $a_{f-1}$, $a_{f-1}$ is an integer, $a_{f-1} \in [0, 8191]$, a vector formed by the 256 coefficients of the polynomial A is $(a_0, a_1, \ldots, a_{255})$, a vector $(a_{128}, a_{129}, \ldots, a_{255})$ formed by the first 128 coefficients of the polynomial A is denoted as $A_H$, a vector $(a_0, a_1, \ldots, a_{127})$ formed by the last 128 coefficients of the polynomial A is denoted as $A_L$, an $m^{th}$ data in $A_L$ is denoted as $A_{Lm}$, $A_{Lm}=a_{m-1}$, $m=1, 2, \ldots, 128$, and an $m^{th}$ data in $A_H$ is denoted as $A_{Hm}$, and $A_{Hm}=a_{m+127}$;

S2: From the output terminal of the coefficient memory, $A_H$ and $A_L$ are output to the first parallel pre-adding circuit, $S_H$ and $S_L$ are output to the second parallel pre-adding circuit, $A_H$ and $S_H$ are output to the first parallel multiplication circuit, and $A_L$ and $S_L$ are output to the second parallel multiplication circuit, through the output port of the coefficient memory according to a preset time sequence under the control of the clock signal CLK;

As shown in FIG. 3, the first parallel pre-adding circuit processes $A_H$ and $A_L$ according to formula (1) to obtain a result $R_A$, which is output to the third parallel multiplication circuit through the output port of the first parallel pre-adding circuit:

$$ra_{m-1} = (A_{Hm} + A_{Lm}) \bmod 8192 \quad (1)$$

Figure 4:
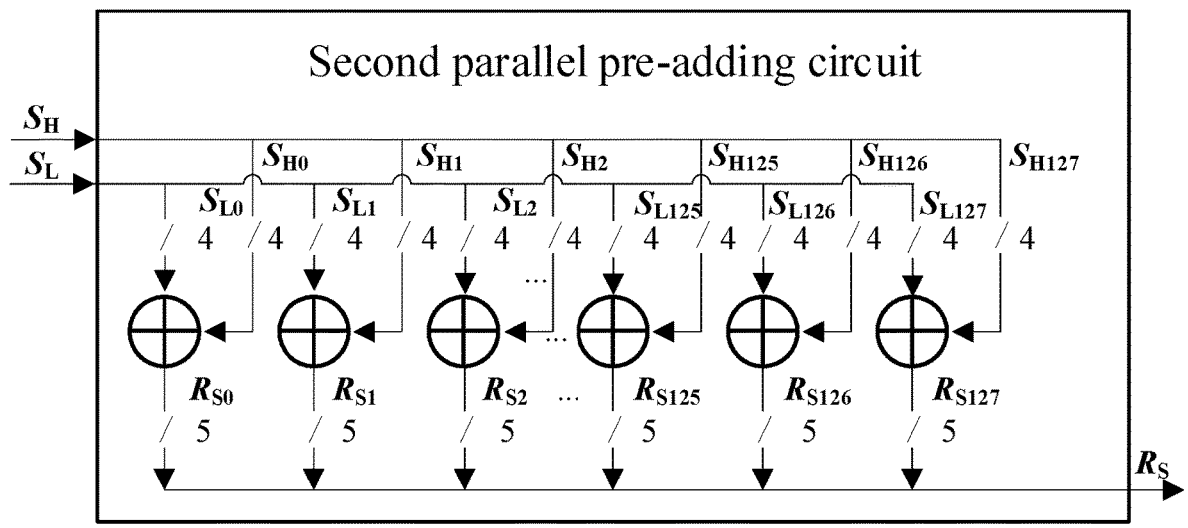
FIG. 4 is a principle block diagram of a second parallel pre-adding circuit of the parallel multiplier for the Saber algorithm according to the invention.

Where, mod is a modulo operator, mod 8192 represents an 8192 modulo operation performed on $(A_{Hm}+A_{Lm})$, $ra_{m-1}$ is an $m^{th}$ data in $R_A$, and $R_A$ includes 128 data $(ra_0, ra_1, \ldots, ra_{127})$;

As shown in FIG. 4, the second parallel pre-adding circuit processes $S_H$ and $S_L$ according to formula (2) to obtain a result $R_S$, which is output to the third parallel multiplication circuit through the output port of the second parallel pre-adding circuit:

$$rs_{n-1} = (S_{Hn} + S_{Ln}) \quad (2)$$

Figure 5:
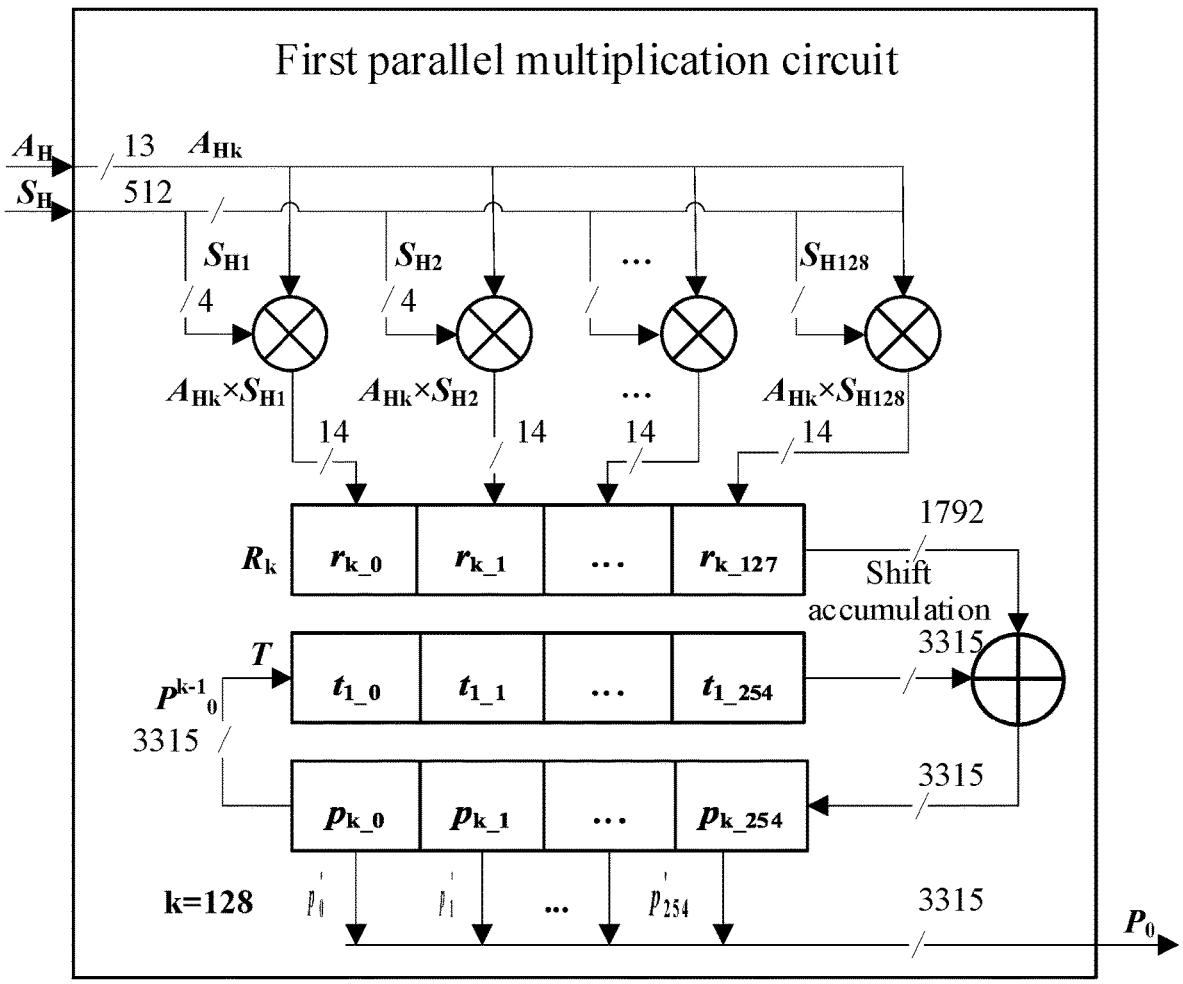
FIG. 5 is a principle block diagram of a first parallel multiplication circuit of the parallel multiplier for the Saber algorithm according to the invention.

Where, $rs_{n-1}$ is an $n^{th}$ data in $R_S$, and $R_S$ includes 128 data $(rs_0, rs_1, \ldots, rs_{127})$;

S3: As shown in FIG. 5, the first parallel multiplication circuit processes $A_H$ and $S_H$ through the following steps to obtain an output result $P_0$, which is output to the post-adding circuit:

S3.1: a round variable k and an intermediate vector T including 255 data are set, wherein $T=(t_{1\_0}, t_{1\_1}, \ldots, t_{1\_254})$, $t_{1\_j}$ is a $(j+1)^{th}$ data in T, and $j=0, 1, 2, \ldots, 254$; k and T are initialized to $k=1$, $t_{1\_j}=0$;

S3.2: a $k^{th}$ round of shift accumulation is performed, specifically:

S3.2.1: an intermediate vector $R_k$ is set, and each data in the intermediate vector $R_k$ is calculated according to formula (3):

$$r_{k\_n-1} = A_{Hk} \times S_{Hn} \quad (3)$$

Figure 6:
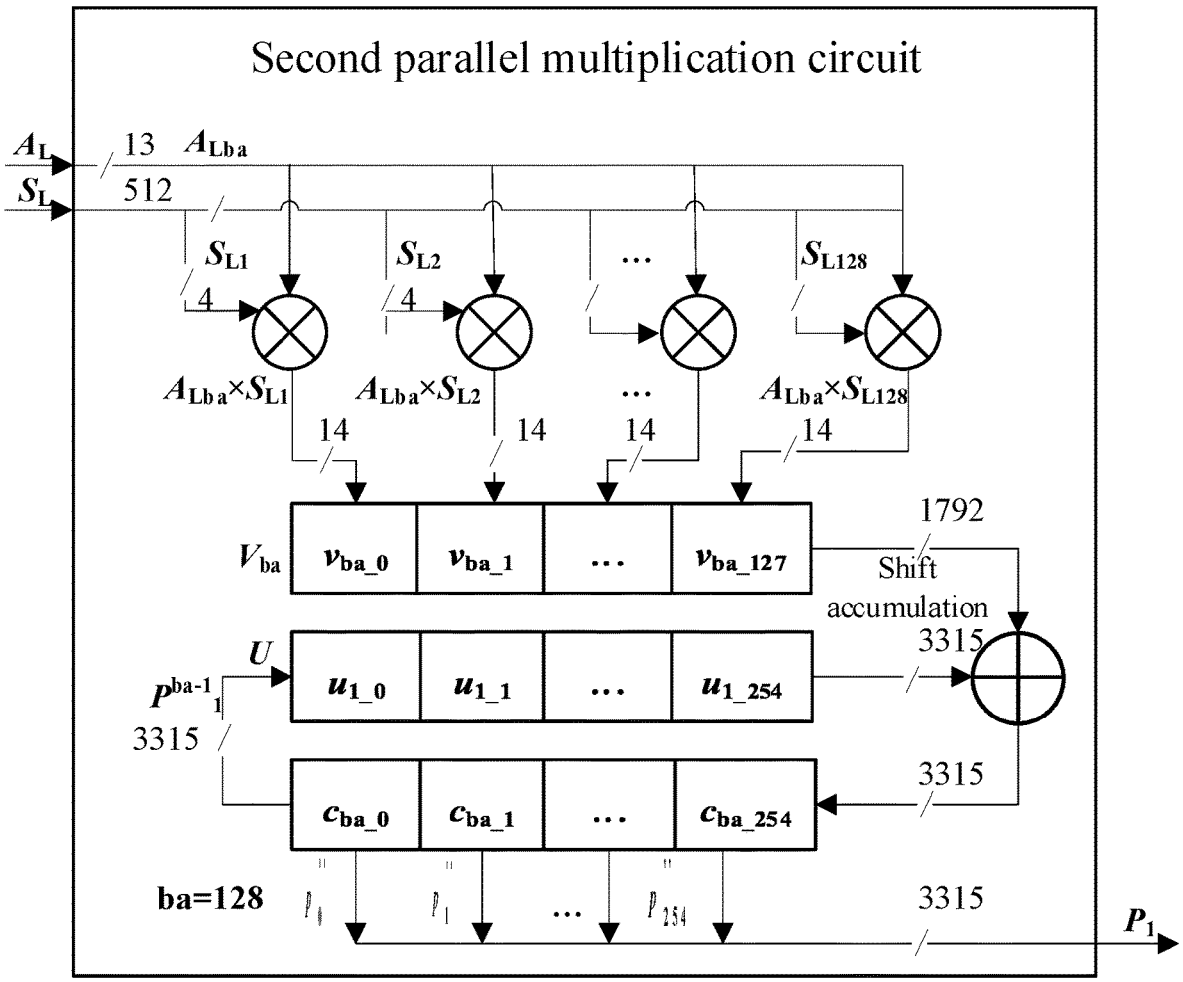
FIG. 6 is a principle block diagram of a second parallel multiplication circuit of the parallel multiplier for the Saber algorithm according to the invention.

Where, $r_{k\_n-1}$ is an $n^{th}$ data in $R_k$, and $R_k$ includes 128 data $(r_{k\_0}, r_{k\_1}, \ldots, r_{k\_127})$;

S3.2.2: an intermediate $P_0^k$ including 255 data is set, $P_0^k = (p_{k\_0}, p_{k\_1}, \ldots, p_{k\_254})$, where $p_{k\_j}$ is a $(j+1)^{th}$ data in $P_0^k$;

When $k=1$, $p_{k\_d} = t_{1\_d} + r_{k\_d}$, $p_{k\_b} = t_{1\_b}$, where $d=0, 1, 2, \ldots, 127$, $b=128, 129, \ldots, 254$, and the values of $t_{1\_d}$ and $t_{1\_b}$ are current latest values;

When $2 \leq k < 128$, $p_{k\_0} = t_{1\_0}, \ldots, p_{k\_k-2} = t_{1\_k-2}$; $p_{k\_k-1} = t_{1\_k-1} + r_{k\_0}$, $p_{k\_k} = t_{1\_k} + r_{k\_1}, \ldots, p_{k\_k+126} = t_{1\_k+126} + r_{k\_127}$; $p_{k\_k+127} = t_{1\_k+127}, \ldots p_{k\_254} = t_{1\_254}$, where the value of $t_{1\_j}$ is a current latest value;

When $k=128$, $p_{k\_e} = t_{1\_e} + r_{k\_e}$, $p_{k\_g} = t_{1\_g}$, where $e=0, 1, 2, \ldots, 126$, $g=127, 128, \ldots 254$, and the values of $t_{1\_e}$ and $t_{1\_g}$ are current latest values;

S3.2.3: each data in the intermediate vector T is updated, $t_{1\_j} = p_{k\_j}$;

S3.3: whether the value of k is equal to 128 is determined; in response the value of k being not equal to 128, the value of k is updated to the sum of a current value of k and 1, and then S3.2 is executed to perform the next round of shift accumulation; in response the value of k being equal to 128, setting $p_{128\_j}=p_j'$ and outputting result $P_0=(p_0', p_1', \ldots, p_{254}')$, where $p_j'$ is a $(j+1)^{th}$ data in $P_0$;

As shown in FIG. 6, the second parallel multiplication circuit processes $A_L$ and $S_L$ through the following steps to obtain an output result $P_1$, which is output to the post-adding circuit:

S3.4: a round variable ba and an intermediate variable U including 255 data are set, where $U=(u_{1\_0}, u_{1\_1}, \ldots, u_{1\_254})$, and $u_{1\_j}$ is a $(j+1)^{th}$ data in U; ba and U are initialized to ba=1, $u_{1\_j}=0$;

S3.5: a $ba^{th}$ round of shift accumulation is performed, specifically:

S3.5.1: an intermediate vector $V_{ba}$ is set, and each data in the intermediate vector $V_{ba}$ is calculated according to formula (4):

$$v_{ba\_n-1}=A_{Lba} \times S_{Ln} \qquad (4)$$

Figure 7:
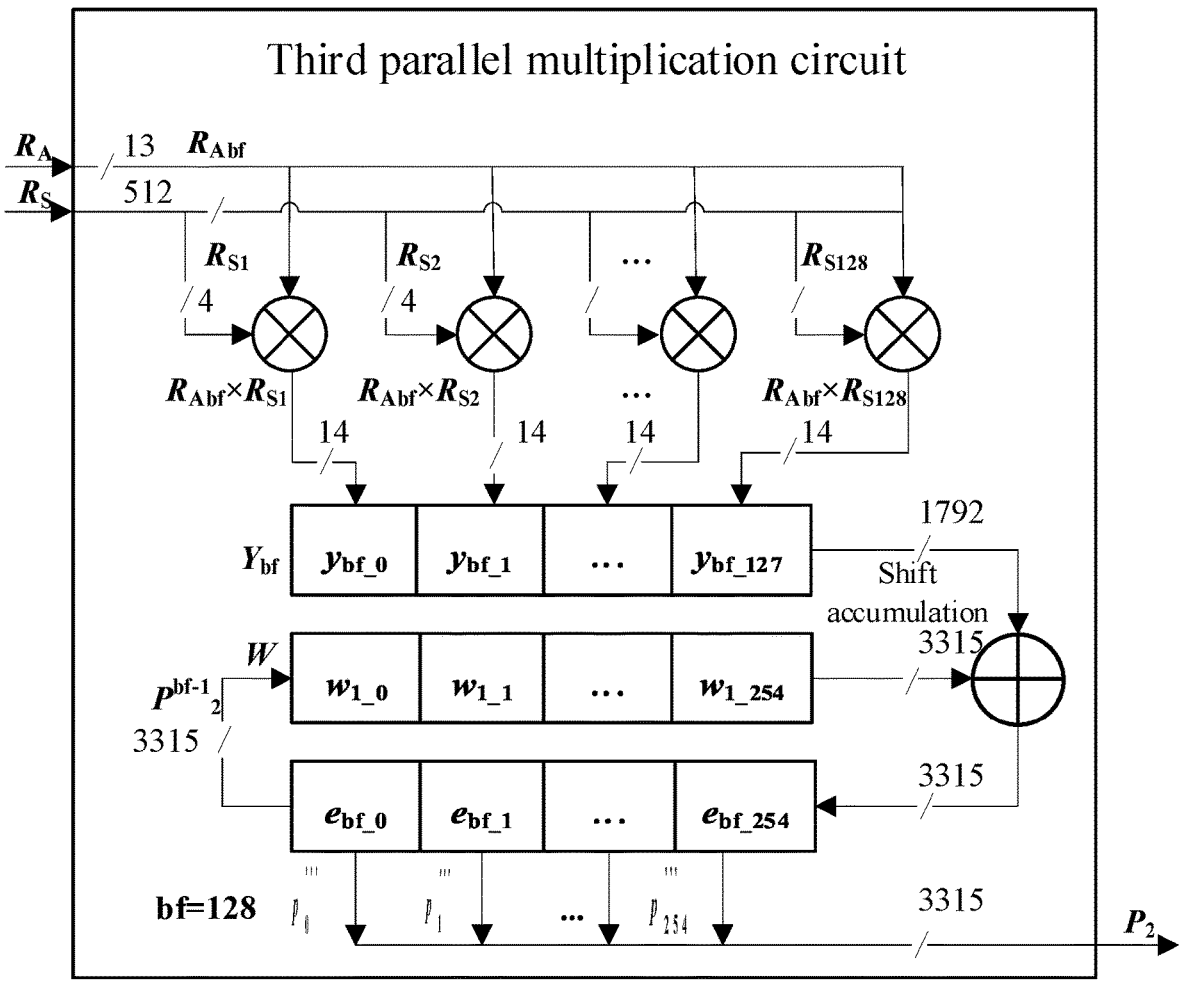
FIG. 7 is a principle block diagram of a third parallel multiplication circuit of the parallel multiplier for the Saber algorithm according to the invention.

Where, $v_{ba\_n-1}$ is an $n^{th}$ data in $V_{ba}$, and $V_{ba}$ includes 128 data $(v_{ba\_0}, v_{ba\_1}, \ldots, v_{ba\_127})$;

S3.5.2: an intermediate vector $P_1^{ba}$ including 255 data is set, $P_1^{ba}=(c_{ba\_0}, c_{ba\_1}, \ldots, c_{ba\_254})$, where $c_{ba\_j}$ is a $(j+1)^{th}$ data in $P_1^{ba}$;

When ba=1, $c_{ba\_da}=u_{1\_da}+v_{ba\_da}$, $c_{ba\_bb}=u_{1\_bb}$, where da=0, 1, 2, ..., 127, bb=128, 129, ..., 254, and the values of $u_{1\_da}$ and $u_{1\_bb}$ are current latest values;

When 2≤ba<128, $c_{ba\_0}=u_{1\_0}, \ldots, c_{ba\_ba-2}=u_{1\_ba-2}$; $c_{ba\_ba-1}=u_{1\_ba-1}+v_{ba\_0}$, $c_{ba\_ba}=u_{1\_ba}+v_{ba\_1}, \ldots$, $c_{ba\_ba+126}=u_{1\_ba+126}+v_{ba\_127}$; $c_{ba\_ba+127}=u_{1\_ba+127}, \ldots, c_{ba\_254}=u_{1\_254}$, where the value of $u_{1\_j}$ is a current latest value;

When ba=128, $c_{ba\_bc}=u_{1\_bc}+v_{ba\_bc}$ $c_{ba\_ba}=u_{1\_ba}$, where bc=0, 1, 2, ..., 126, bd=127, 128, ..., 254, and the values of $u_{1\_bc}$ and $u_{1\_bd}$ are current latest values;

S3.5.3: each data in the intermediate vector U is updated, $u_{1\_j}=c_{ba\_j}$;

S3.6: whether the value of ba is equal to 128 is determined; in response the value of ba being not equal to 128, the value of ba is updated to the sum of a current value of ba and 1, and then S3.5 is executed to perform the next round of shift accumulation; in response the value of ba being equal to 128, setting $c_{128\_j}=p_j''$ and outputting result $P_1=(p_0'', p_1'', \ldots, p_{254}'')$, where $p_j''$ is a $(j+1)^{th}$ data in $P_1$;

As shown in FIG. 7, the third parallel multiplication circuit processes $R_A$ and $R_S$ through the following steps to obtain an output result $P_2$, which is output to the post-adding circuit:

S3.7: a round variable bf and an intermediate vector W including 255 data are set, where $W=(w_{1\_0}, w_{1\_1}, \ldots, w_{1\_254})$, and $w_{1\_j}$ is a $(j+1)^{th}$ data in W; bf and W are initialized to bf=1, $w_{1\_j}=0$;

S3.8: a $bf^{th}$ round of shift accumulation is performed, specifically:

S3.8.1: an intermediate vector $Y_{bf}$ is set, and each data in the intermediate vector $Y_{bf}$ is calculated according to formula (5):

$$y_{bf\_n-1}=R_{Abf} \times R_{Sn} \qquad (5)$$

Where, $y_{bf\_n-1}$ is an $n^{th}$ data in $Y_{bf}$, and $Y_{bf}$ includes 128 data $(y_{bf\_0}, y_{bf\_1}, \ldots, y_{bf\_127})$; $R_{Abf}$ is a $bf^{th}$ data in $R_A$, and $R_{Sn}$ is an $n^{th}$ data in $R_S$;

S3.8.2: an intermediate vector $P_2^{bf}$ including 255 data is set, $P_2^{bf}=(e_{bf\_0}, e_{bf\_1}, \ldots, e_{bf\_254})$, where $e_{bf\_j}$ is a $(j+1)$ data in $P_2^{bf}$.

When bf=1, $e_{bf\_bg}=w_{1\_bg}+y_{bf\_bg}$, $e_{bf\_bm}=w_{1\_bm}$, where bg=0, 1, 2, ..., 127, bm=128, 129, ..., 254, and the values of $w_{1\_bg}$ and $w_{1\_bm}$ are current latest values;

When 2≤bf<128, $e_{bf\_0}=w_{1\_0}, \ldots, e_{bf\_bf-2}=w_{1\_bf-2}$; $e_{bf\_bf-1}=w_{1\_bf-1}+y_{bf\_0}$, $e_{bf\_bf}=w_{1\_bf}+y_{bf\_1}, \ldots$, $e_{bf\_bf+126}=w_{1\_bf+126}+y_{bf\_127}$; $e_{bf\_bf+127}=w_{1\_bf+127}, \ldots$, $e_{bf\_254}=w_{1\_254}$, where the value of $w_{1\_j}$ is a current latest value;

When bf=128, $e_{bf\_bn}=w_{1\_bn}+y_{bf\_bn}$, $e_{bf\_bp}=w_{1\_bp}$, where bn=0, 1, 2, ... 126, bp=127, 128, ..., 254, and the values of $w_{1\_bn}$ and $w_{1\_bp}$ are current latest values;

S3.8.3: each data in the intermediate vector W is updated, $w_{1\_j}=e_{bf\_j}$;

S3.9: whether the value of bf is equal to 128 is determined; in response the value of bf being not equal to 128, the value of bf is updated to the sum of a current value of bf and 1, and then S3.8 is executed to perform the next round of shift accumulation; in response the value of bf being not equal to 128, setting $e_{128\_j}=p_j'''$ and outputting result $P_2=(p_0''', p_1''', \ldots, p_{254}''')$, where $p_j'''$ is a $(j+1)^{th}$ data in $P_2$;

S4: The post-adding circuit processes $P_2$, $P_1$ and $P_0$ through the following steps to obtain and output the final operation result OUT, specifically:

S4.1: an intermediate vector $Tmp_0$ including 255 data is set, and each data in the intermediate vector $Tmp_0$ is calculated according to formula (6):

$$tmp_{0\_j}=p_j''-p_j' \qquad (6)$$

Where, $tmp_{0\_j}$ is a $(j+1)^{th}$ data in $Tmp_0$, and $Tmp_0$ includes 255 data $(tmp_{0\_0}, tmp_{0\_1}, \ldots, tmp_{0\_254})$;

S4.2: an intermediate vector $Tmp_1$ including 255 data is set, and each data in the intermediate vector $Tmp_1$ is calculated according to formula (7):

$$tmp_{1\_j}=p_j'''-p_j''-p_j' \qquad (7)$$

Where, $tmp_{1\_j}$ is a $(j+1)^{th}$ data in $Tmp_1$, and $Tmp_1$ includes 255 data $(tmp_{1\_0}, tmp_{1\_1}, \ldots, tmp_{1\_254})$;

S4.3: each data in OUT is calculated according to formula (8), formula (8), formula (10) and formula (11):

$$out_{loop1}=tmp_{0\_loop1}-tmp_{1\_loop1+128} \qquad (8)$$

$$out_{loop2}=tmp_{0\_loop2}-tmp_{1\_loop2-128} \qquad (9)$$

$$out_{127}=tmp_{0\_127} \qquad (10)$$

$$out_{255}=tmp_{1\_127} \qquad (11)$$

Where, loop1=0, 1, ..., 126; loop2=128, 129, ..., 254; OUT includes 256 data $(out_0, out_1, \ldots, out_{255})$.

Figure 8:
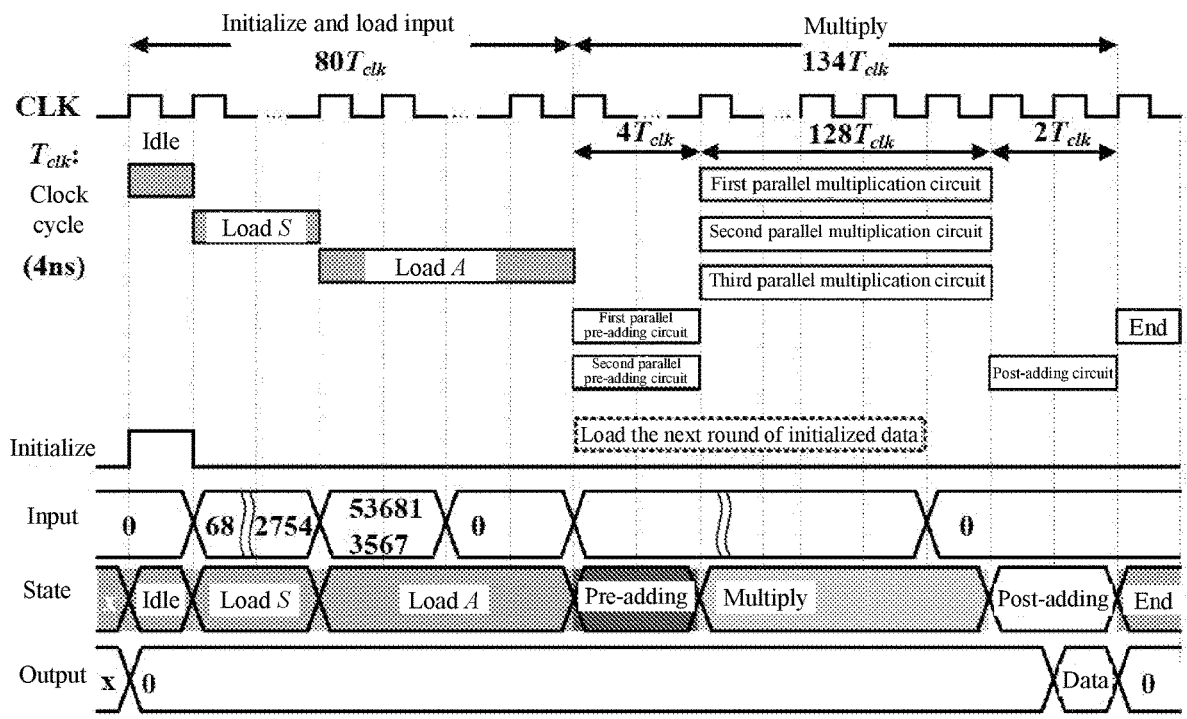
FIG. 8 is a simulation oscillogram of the time sequence of the parallel multiplier for the Saber algorithm according to the invention.

The simulation oscillogram of the time sequence of the parallel multiplier for the Saber algorithm provided by the invention is shown in FIG. 8. Time sequence information reflects the working state of the parallel multiplier for the Saber algorithm. It can be known, by analyzing FIG. 8, that the parallel multiplier for the Saber algorithm provided by the invention has a data loading (80Tclk) state and a multiplication state, wherein Tclk is the clock cycle of the clock signal CLK, and the value of Tclk is 4 ns. In the multiplication state, the parallel multiplier has three computation stages: a parallel pre-adding stage, a multiplication stage, and a post-adding stage, wherein the parallel pre-adding stage takes a computation time of 4Tclk, and the waveform corresponds to computation circuits of $R_A$ and $R_S$; the multiplication stage takes a computation time of 128Tclk; the post-adding stage takes a computation time of 2Tclk. According to the pipeline computation characteristics, the next round of initialized data can be loaded during 134Tclk multiplication. The computation cycle of each multiplication is 134Tclk without regard to the loading of initialized data, and compared with the computation cycle 256Tclk of traditional methods, the computation speed is increased by 47.6%.

Figure 9:
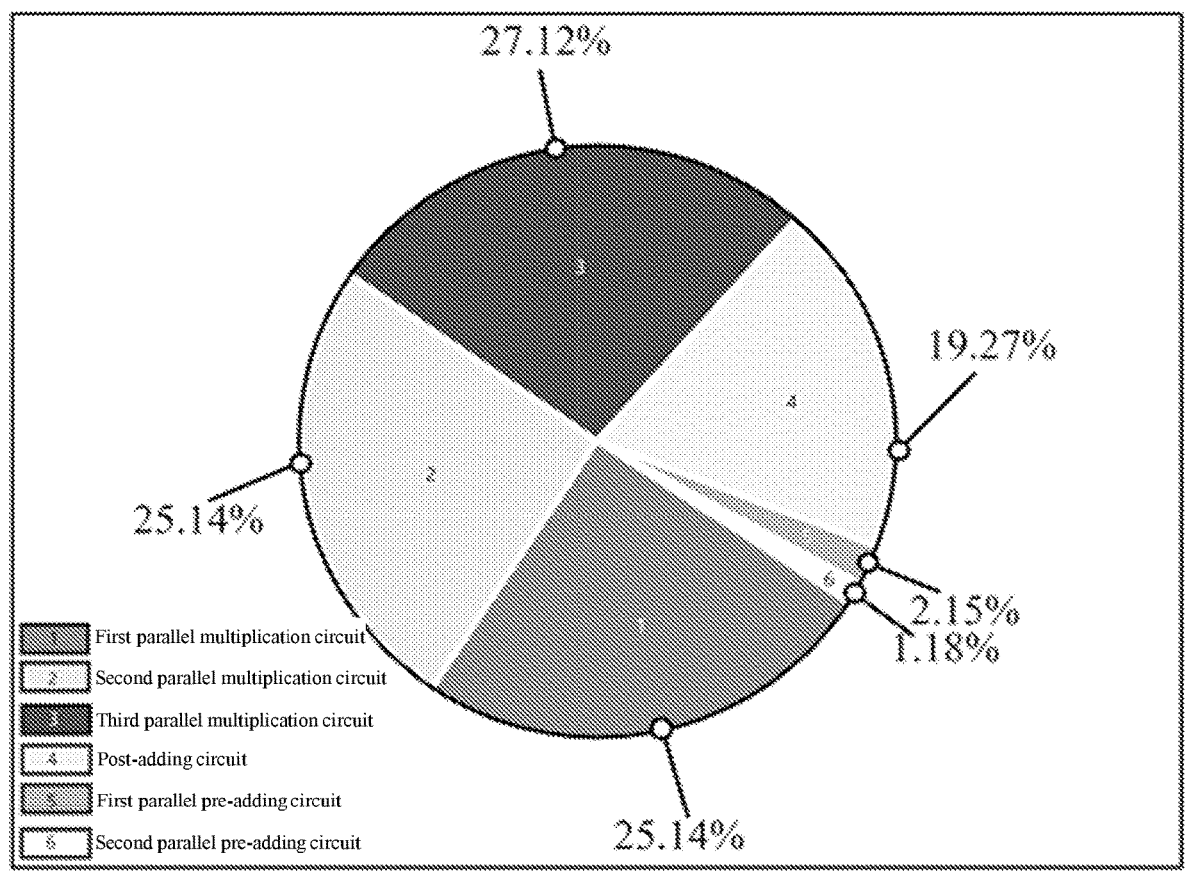
FIG. 9 illustrates the area proportions of all modules of the parallel multiplier for the Saber algorithm according to the invention.

The area proportions of the modules of the parallel multiplier for the Saber algorithm provided by the invention are shown in FIG. 9. It can be known, by analyzing FIG. 9, that the total area of the parallel multiplier is 927.32 K$\mu m^2$, so the area expenditure is small. Wherein, the area proportion of the first parallel multiplication circuit and the area proportion of the second parallel multiplication circuit are 25.14% respectively, the area proportion of the third parallel multiplication circuit is 27.12%, the area proportion of the post-adding circuit is 19.27%, the area proportion of the first parallel pre-adding circuit and the area proportion of the second parallel pre-charge circuit are 2.15% and 1.18% respectively. The total area proportion of the three parallel multiplication circuits is large, which is 77.5% of the total area of the parallel multiplier.

What is claimed is:

1. A parallel multiplier of a first computer terminal for establishing a cryptographic communication between the first computer terminal and a second computer terminal, characterized in that comprises:
   a coefficient memory;
   two parallel pre-adding circuits;
   three parallel multiplication circuits; and
   a post-adding circuit,
   wherein the coefficient memory has a coefficient input terminal, a clock input terminal and a coefficient output terminal,
      the coefficient input terminal of the coefficient memory, as a data input terminal of the parallel multiplier, is used for inputting coefficient data for modulo multiplication of two polynomials,
      the clock input terminal of the coefficient memory, as a clock input terminal of the parallel multiplier, is used for inputting a clock signal CLK,
   the two parallel pre-adding circuits are referred to as a first parallel pre-adding circuit and a second parallel pre-adding circuit respectively,
      the first parallel pre-adding circuit has two input ports and a data output port,
      the second parallel pre-adding circuit has two input ports and a data output port,
   the three parallel multiplication circuits are referred to as a first parallel multiplication circuit, a second parallel multiplication circuit and a third parallel multiplication circuit respectively,
      the first parallel multiplication circuit and the second parallel multiplication circuit each have an input port and an output port,
      the third parallel multiplication circuit has two input ports and an output port, the post-adding circuit has three input ports and an output port,
      the two input ports of the first parallel pre-adding circuit and the two input ports of the second parallel pre-adding circuit are connected to the coefficient output terminal of the coefficient memory,
      the input port of the first parallel multiplication circuit and the input port of the second parallel multiplication circuit are connected to an output port of the coefficient memory,
      the two input ports of the third parallel multiplication circuit are connected to the output port of the first parallel multiplication circuit and the output port of the second parallel pre-adding circuit in a one-to-one correspondence manner, the output port of the first parallel multiplication circuit,
      the output port of the second parallel multiplication circuit and the output port of the third parallel multiplication circuit are connected to the three input ports of the post-adding circuit in a one-to-one correspondence manner, and
      the output port of the post-adding circuit, as an output terminal of the parallel multiplier, is used for outputting a final result OUT to transmit to the second computer terminal over a network as output data for the cryptographic communication,
   wherein in response to two polynomials are received at a input terminal of the parallel multiplier of the first computer terminal as input data for the cryptographic communication, the parallel multiplier multiplies coefficients of the polynomials specifically through the following steps:
   S1: loading the two polynomials into the coefficient memory, and denoting the two polynomials as a polynomial S and a polynomial A respectively,
   wherein the polynomial S comprises 256 coefficients, and a coefficient of an $f^{th}$ term (the $f^{th}$ coefficient) of the polynomial S is denoted as $s_{f-1}$, f=1, 2, . . . , 256, $s_{f-1}$ is an integer, $s_{f-1} \in [-4, 4]$,
      a vector formed by the 256 coefficients of the polynomial S is ($s_0, s_1, \ldots, s_{255}$),
         a vector ($s_{128}, s_{129}, \ldots, s_{255}$) formed by the first 128 coefficients of the polynomial S is denoted as $S_H$,
         a vector ($s_0, s_1, \ldots, s_{127}$) formed by the last 128 coefficients of the polynomial S is denoted as $S_L$,
         an $n^{th}$ data in $S_L$ is denoted as $S_{Ln}$, $S_{Ln}=S_{n-1}$, n=1, 2, . . . , 128, an $n^{th}$ data in $S_H$ is denoted as $S_{Hn}$, and $S_{Hn}=s_{n+127}$,
   the polynomial A comprises 256 coefficients, each of the 256 coefficients has a bit width of 16 bits,
      13 bits or 10 bits of the 16 bits are significant bits,
      other 3 bits or 6 bits of the 16 bits are used for data completion and coefficient alignment,
      the bit width of the data is set to 16 bits to ensure that 64 bits data of the polynomial A includes four consecutive coefficients,
      the coefficient of an $f^{th}$ term (the $f^{th}$ coefficient) of the polynomial A is denoted as $a_{f-1}$, $a_{f-1}$ is an integer, $a_{f-1} \in [0, 8191]$,
      a vector formed by the 256 coefficients of the polynomial A is ($a_0, a_1, \ldots, a_{255}$),
         a vector ($a_{128}, a_{129}, \ldots, a_{255}$) formed by the first 128 coefficients of the polynomial A is denoted as $A_H$,
         a vector ($a_0, a_1, \ldots, a_{127}$) formed by the last 128 coefficients of the polynomial A is denoted as $A_L$,
         an $m^{th}$ data in $A_L$ is denoted as $A_{Lm}$, $A_{Lm}=a_{m-1}$, m=1, 2, . . . , 128, and
         an $m^{th}$ data in $A_H$ is denoted as $A_{Hm}$, and $A_{Hm}=a_{m+127}$;
   S2: through the output terminal of the coefficient memory, according to a preset time sequence under the control of the clock signal CLK, outputting $A_H$ and $A_L$ to the first parallel pre-adding circuit, outputting $S_H$ and $S_L$ to the second parallel pre-adding circuit, outputting $A_H$ and $S_H$ to the first parallel multiplication circuit, and outputting $A_L$ and $S_L$ to the second parallel multiplication circuit,
   processing $A_H$ and $A_L$ by the first parallel pre-adding circuit according to a formula (1) to obtain a result $R_A$, which is output to the third parallel multiplication circuit through the output port of the first parallel pre-adding circuit:

$$ra_{m-1}=(A_{Hm}+A_{Lm}) \mod 8192 \qquad (1)$$

wherein mod is a modulo operator, mod 8192 represents an 8192 modulo operation performed on $(A_{Hm}+A_{Lm})$, $ra_{m-1}$ is an $m^{th}$ data in $R_A$, and $R_A$ includes 128 data ($ra_0, ra_1, \ldots, ra_{127}$), processing $S_H$ and $S_L$ by the second parallel pre-adding circuit according to a formula (2) to obtain a result $R_S$, which is output to the third parallel multiplication circuit through the output port of the second parallel pre-adding circuit:

$$rs_{n-1}=(S_{Hn}+S_{Ln}) \qquad (2)$$

wherein $rs_{n-1}$ is an $n^{th}$ data in $R_S$, and $R_S$ includes 128 data ($rs_0, rs_1, \ldots, rs_{127}$);

S3: processing $A_H$ and $S_H$ by the first parallel multiplication circuit through the following steps to obtain an output result $P_0$, which is output to the post-adding circuit, wherein the step S3 comprises:

S3.1: setting a round variable k and an intermediate vector T including 255 data,
wherein $T=(t_{1\_0}, t_{1\_1}, \ldots, t_{1\_254})$, $t_{1\_j}$ is a $(j+1)^{th}$ data in T, and $j=0, 1, 2, \ldots, 254$, and k and T are initialized to $k=1$ and $t_{1\_j}=0$;

S3.2: performing a $k^{th}$ round of shift accumulation, which specifically comprises:

S3.2.1: setting an intermediate vector $R_k$, and calculating each data in the intermediate vector $R_k$ according to a formula (3):

$$r_{k\_n-1}=A_{Hk} \times S_{Hn} \qquad (3)$$

wherein $r_{k\_n-1}$ is an $n^{th}$ data in $R_k$, and $R_k$ includes 128 data ($r_{k\_0}, r_{k\_1}, \ldots, r_{k\_127}$);

S3.2.2: setting an intermediate $P_0^k$ including 255 data, $P_0^k=(p_{k\_0}, p_{k\_1}, \ldots, p_{k\_254})$, where $p_{k\_j}$ is a $(j+1)^{th}$ data in $P_0^k$, when $k=1$, $p_{k\_d}=t_{1\_d}+r_{k\_d}$, $p_{k\_b}=t_{1\_b}$, where $d=0, 1, 2, \ldots, 127$, $b=128, 129, \ldots, 254$, and the values of $t_{1\_d}$ and $t_{1\_b}$ are current latest values, when $2 \leq k < 128$, $p_{k\_0}=t_{1\_0}, \ldots, P_{k\_k-2}=t_{1\_k-2}$, $P_{k\_k-1}=t_{1\_k-1}+r_{k\_0}$, $p_{k\_k}=t_{1\_k}+r_{k\_1}, \ldots$, $p_{k\_k+126}+t_{1\_k+126}+r_{k\_127}$, $p_{k\_k+127}t_{1\_k+127}, \ldots$ $p_{k\_254}=t_{1\_254}$, where the value of $t_{1\_j}$ is a current latest value, when $k=128$, $p_{k\_e}=t_{1\_e}+r_{k\_e}$, $p_{k\_g}=t_{1\_g}$, where $e=0, 1, 2, \ldots, 126$, $g=127, 128, \ldots, 254$, and the values of $t_{1\_e}$ and $t_{1\_g}$ are current latest values; and S3.2.3: updating each data in the intermediate vector T, $t_{1\_j}=p_{k\_j}$;

S3.3: determining whether the value of k is equal to 128,
in responding to k being not equal to 128, updating the value of k to the sum of a current value of k and 1, and then returning to S3.2 to perform the next round of shift accumulation,
in responding to k being equal to 128, setting $p_{128\_j}=p_j'$ and outputting result $P_0=(p_0', p_1', \ldots, p_{254}')$, where $p_j'$ is a $(j+1)^{th}$ data in $P_0$, and processing $A_L$ and $S_L$ by the second parallel multiplication circuit through the following steps to obtain an output result $P_1$, which is output to the post-adding circuit:

S3.4: setting a round variable ba and an intermediate variable U including 255 data,
where $U=(u_{1\_0}, u_{1\_1}, \ldots, u_{1\_254})$, and $u_{1\_j}$ is a $(j+1)^{th}$ data in U; ba and U are initialized to $ba=1$, $u_{1\_j}=0$;

S3.5: performing a $ba^{th}$ round of shift accumulation, wherein the step S3.5 comprises:

S3.5.1: setting an intermediate vector $V_{ba}$, and calculating each data in the intermediate vector $V_{ba}$ according to a formula (4):

$$v_{ba\_n-1}=A_{Lba} \times S_{Ln} \qquad (4)$$

where, $v_{ba\_n-1}$ is an $n^{th}$ data in $V_{ba}$, and $V_{ba}$ includes 128 data ($v_{ba\_0}, v_{ba\_1}, \ldots, v_{ba\_127}$);

S3.5.2: setting an intermediate vector $P_1^{ba}$ including 255 data, $P_1^{ba}=(c_{ba\_0}, c_{ba\_1}, \ldots, c_{ba\_254})$, where $c_{ba\_j}$ is a $(j+1)^{th}$ data in $P_1^{ba}$, when $ba=1$, $c_{ba\_da}=u_{1\_da}+v_{ba\_da}$, $c_{ba\_bb}=u_{1\_bb}$, where $da=0, 1, 2, \ldots, 127$, $bb=128, 129, \ldots, 254$, and the values of $u_{1\_da}$ and $u_{1\_bb}$ are current latest values, when $2 \leq ba < 128$, $c_{ba\_0}=u_{1\_0}, \ldots, c_{ba\_ba-2}=u_{1\_ba-2}$, $c_{ba\_ba-1}=u_{1\_ba-1}+v_{ba\_0}$, $c_{ba\_ba}=u_{1\_ba}+v_{ba\_1}, \ldots$, $c_{ba\_ba+126}=u_{1\_ba+126}+v_{ba\_127}$, $c_{ba\_ba+127}=u_{1\_ba+127}, \ldots, c_{ba\_254}=u_{1\_254}$, where the value of $u_{1\_j}$ is a current latest value, when $ba=128$, $c_{ba\_bc}=u_{1\_bc}+v_{ba\_bc}$ $c_{ba\_bd}=u_{1\_bd}$, where $bc=0, 1, 2, \ldots, 126$, $bd=127, 128, \ldots, 254$, and the values of $u_{1\_bc}$ and $u_{1\_bd}$ are current latest values; and S3.5.3: each data in the intermediate vector U is updated, $u_{1\_j}=c_{ba\_j}$;

S3.6: determining whether the value of ba is equal to 128,
in response to the value of ba being not equal to 128, updating the value of ba to the sum of a current value of ba and 1, and then returning to S3.5 to perform the next round of shift accumulation,
in response to the value of ba being equal to 128, setting $c_{128\_j}=p_j''$ and outputting the result $P_1=(p_0'', p_1'', \ldots, p_{254}'')$, where $p_j''$ is a $(j+1)^{th}$ data in $P_1$, and processing $R_A$ and $R_S$ by the third parallel multiplication circuit through the following steps to obtain an output result $P_2$, which is output to the post-adding circuit:

S3.7: setting a round variable bf and an intermediate vector W including 255 data,
where $W=(w_{1\_0}, w_{1\_1}, \ldots, w_{1\_254})$, and $w_{1\_j}$ is a $(j+1)^{th}$ data in W; bf and W are initialized to $bf=1$, $w_{1\_j}=0$;

S3.8: performing a $bf^{th}$ round of shift accumulation, which specifically comprises:

S3.8.1: setting an intermediate vector $Y_{bf}$ and calculating each data in the intermediate vector $Y_{bf}$ according to a formula (5):

$$y_{bf\_n-1}=R_{Abf} \times R_{Sn} \qquad (5)$$

wherein $y_{bf\_n-1}$ is an $n^{th}$ data in $Y_{bf}$, and $Y_{bf}$ includes 128 data ($y_{bf\_0}, y_{bf\_1}, \ldots, y_{bf\_127}$); $R_{Abf}$ is a $bf^{th}$ data in $R_A$, and $R_{Sn}$ is an $n^{th}$ data in $R_S$;

S3.8.2: setting an intermediate vector $P_2^{bf}$ including 255 data, $P_2^{bf}=(e_{bf\_0}, e_{bf\_1}, \ldots, e_{bf\_254})$, where $e_{bf\_j}$ is a $(j+1)^{th}$ data in $P_2^{bf}$, when bf=1, $e_{bf\_bg}=w_{1\_bg}+y_{bf\_bg}$, $e_{bf\_bm}=w_{1\_bm}$, where bg=0, 1, 2, . . . , 127, bm=128, 129, . . . , 254, and the values of $w_{1\_bg}$ and $w_{1\_bm}$ are current latest values, when 2≤bf<128, $e_{bf\_0}=w_{1\_0}, \ldots, e_{bf\_bf-2}=w_{1\_bf-2}$; $e_{bf\_bf-1}=w_{1\_bf-1}+y_{bf\_0}$, $e_{bf\_bf}=w_{1\_bf}+y_{bf\_1}, \ldots,$ $e_{bf\_bf+126}=w_{1\_bf+126}+y_{bf\_127}$; $e_{bf\_bf+127}=w_{1\_bf+127}, \ldots, e_{bf\_254}=w_{1\_254}$, where the value of $w_{1\_j}$ is a current latest value, and when bf=128, $e_{bf\_bn}=w_{1\_bn}+y_{bf\_bn}$, $e_{bf\_bp}=w_{1\_bp}$, where bn=0, 1, 2, . . . 126, bp=127, 128, . . . , 254, and the values of w1_bn and w1_bp are current latest values; and S3.8.3: updating each data in the intermediate vector W, w1_j=ebf_j; and S3.9: determining whether the value of bf is equal to 128, in response to the value of bf being not equal to 128, updating the value of bf to the sum of a current value of bf and 1, and then returning to S3.8 to perform the next round of shift accumulation, and in response to the value of bf being equal to 128, setting e128_j=$p_j''$ and outputting the result P2= ($p_0''$, $p_1''$, . . . , $p_{254}''$), where $p_j''$ is a (j+1)th data in P2; and S4: processing P2, P1 and P0 by the post-adding circuit through the following steps to obtain and output the final result OUT, wherein the step S4 comprises:

S4.1: setting an intermediate vector Tmp0 including 255 data, and calculating each data in the intermediate vector Tmp0 according to a formula (6):

$$tmp0\_j=p_j''-p_j' \qquad (6)$$

hwerein tmp0_j is a (j+i)th data in Tmp0, and Tmp0 includes 255 data (tmp0_0, tmp0_1, . . . , tmp0_254);

S4.2: setting an intermediate vector Tmp1 including 255 data, and calculating each data in the intermediate vector Tmp1 according to a formula (7):

$$tmp1\_j=p_j'''-p_j''-p_j' \qquad (7)$$

wherein tmp1_j is a (j+1)th data in Tmp1, and Tmp1 includes 255 data (tmp1_0, tmp1_1, . . . , tmp1_254); and S4.3: calculating each data in OUT according to a formula (8), a formula (9), a formula (10) and a formula (11):

$$outloop1=tmp0\_loop1-tmp1\_loop1+128 \qquad (8)$$

$$outloop2=tmp0\_loop2-tmp1\_loop2-128 \qquad (9)$$

$$out127=tmp0\_127 \qquad (10)$$

$$out255=tmp1\_127 \qquad (11)$$

where, loop1=0, 1, . . . , 126; loop2=128, 129, . . . , 254 and the final result OUT includes 256 data (out0, out1, . . . , out255).

\* \* \* \* \*